Jan. 21, 1930.   H. J. BORDES-PAGÈS   1,744,569
APPARATUS FOR THE TRANSPORTATION OF LOADS
Filed April 9, 1928
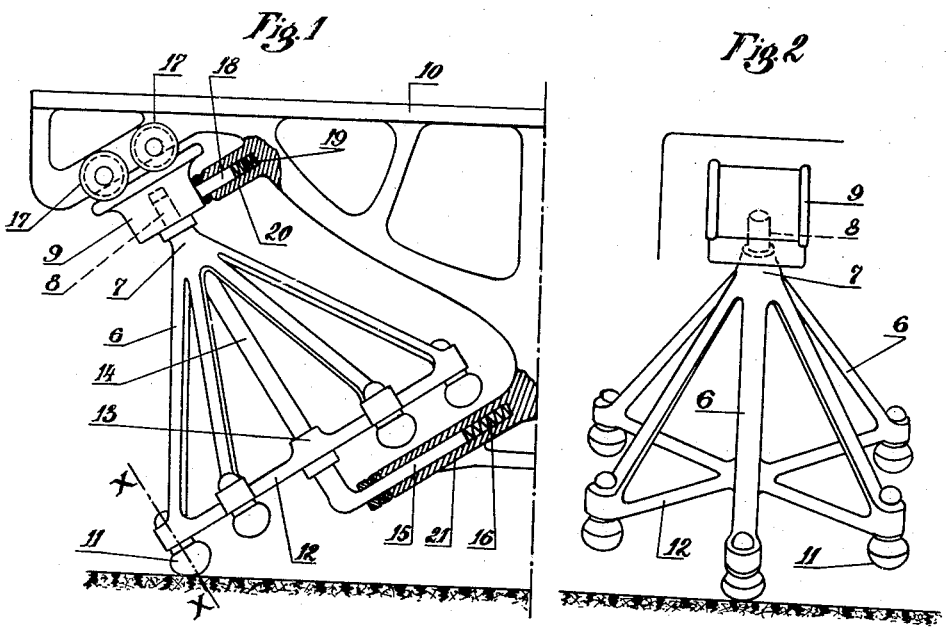
Inventor:
Henri Jean Bordes-Pagès
By
Attorney.

Patented Jan. 21, 1930

1,744,569

UNITED STATES PATENT OFFICE

HENRI JEAN BORDES-PAGÈS, OF NANCY, FRANCE

APPARATUS FOR THE TRANSPORTATION OF LOADS

Application filed April 9, 1928, Serial No. 268,669, and in France April 21, 1927.

The present invention relates to apparatus for the transportation of loads, which can be employed either singly or in groups. The said apparatus consists of a plurality of arms or branches of equal length, which converge, in a conical set or as a flat star, towards a sort of hub pivotally mounted on a frame carrying the load to be transported. The outer end of each arm is preferably provided with a buffer which is pivoted on an axis parallel with the axis of the said hub.

According to a particular form of construction, each arm or branch consists of elements which are mutually slidable or pivoted, with the interposition of elastic bodies, compressed fluid, or springs.

Figs. 1 and 2 are side elevations at right angles to one another, of an apparatus comprising a conical set of members, Fig. 1 being partly in section.

The device shown consists of a certain number of arms or branches 6 of equal length having a conical disposition so as to converge towards a sort of hub 7 which is pivotally mounted, by means of a pin or stud 8 and a support 9, on a main frame 10 upon which is placed the load to be transported, not shown.

Each arm 6 is terminated by a buffer 11 which is pivotally mounted with reference to the respective arm 6 on an axis X—X parallel to the hub 7 and the pin or stud 8.

To increase the mechanical resistance of the device, the ends of the arms or branches 6 are connected together by a spider 12 comprising a central hub 13 in which is pivotally mounted a shaft or axle 14 disposed in line with the axis of the hub 7 and connected with the frame by a right-angled arm 15. One member of this arm projects into a recessed bearing 21 and is subjected therein to the pressure of a damping spring 16.

The support 9 is in contact with the rollers 17 mounted on the said frame, and it also makes contact by means of the arm 18 with a spring 19 placed (like the spring 16) in a suitable bearing 20 on the main frame.

The device thus described can be employed as a wheel, either alone or in sets. One of the buffers 11 will always be in contact with the ground; and in this motion, the set of arms or branches 6 will pivot around the axis X—X of the said buffer. The axis of the conical set, which is represented by the pivot shaft or axle 14, will remain parallel to itself.

However, since the frame 10 usually moves in a straight line, the connection between the support 9 and the said frame must be variable or adjustable, this being readily obtained by means of the arms 18 and 15 disposed in the recessed bearings 20 and 21.

I claim:

1. A load-supporting implement, comprising a frame for directly supporting the load; and an element of conical form mounted within said frame to rotate about an oblique axis and embodying a central hub, a plurality of arms converging toward said hub, and a buffer on the outer end of each arm, said buffers engaging the ground one at a time during the rotation of said element.

2. A load-supporting implement, comprising a frame for directly supporting the load; a shaft disposed within the frame, said frame having bearings for supporting said shaft in oblique position; and an element of conical form mounted to rotate freely on said shaft and embodying a central hub, a plurality of arms converging toward said hub, and a buffer on the outer end of each arm, said buffers engaging the ground one at a time during the rotation of said element.

3. A load-supporting implement, according to claim 2, in which the shaft has laterally-projecting members associated with it which are slidably fitted in said bearings to enable said shaft to move parallel to itself.

4. A load-supporting implement, according to claim 2, in which the shaft has associated with it an upper and a lower member which project at right angles to its axis; the bearing members on the frame being positioned to receive said projecting members slidably therein.

5. A load-supporting implement, according to claim 2, in which the shaft has associated with it an upper and a lower member which project at right angles to its axis; the bearing members on the frame being positioned to receive said projecting members slidably therein, each bearing being provided with an internal cushioning spring to act on the respective member.

In testimony whereof I affix my signature.

HENRI JEAN BORDES-PAGÈS.